March 30, 1926. 1,579,102
C. E. GALE
ROTARY CUTTING TOOL
Filed Dec. 4, 1923
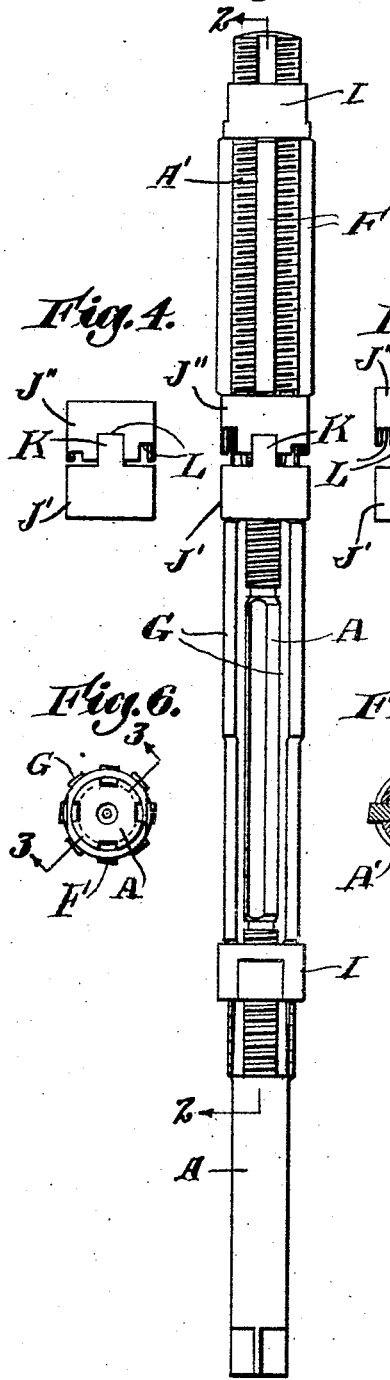
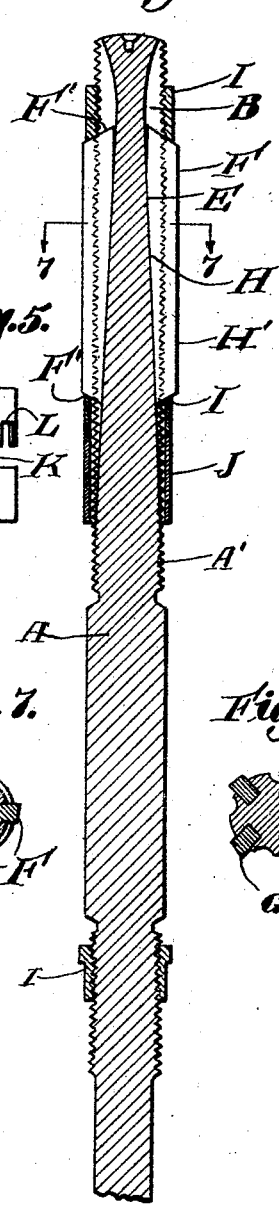
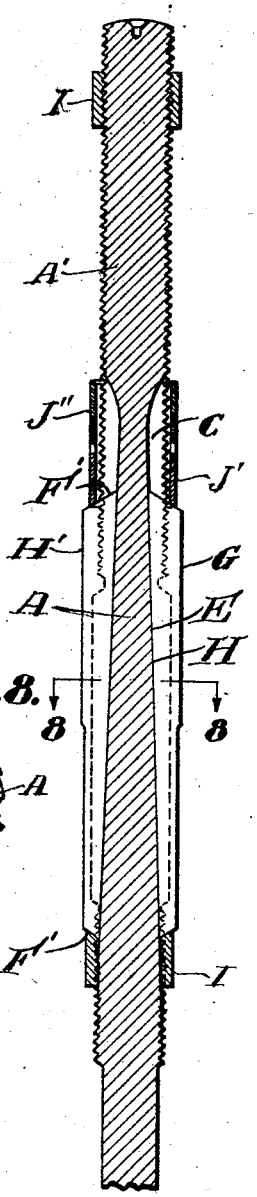
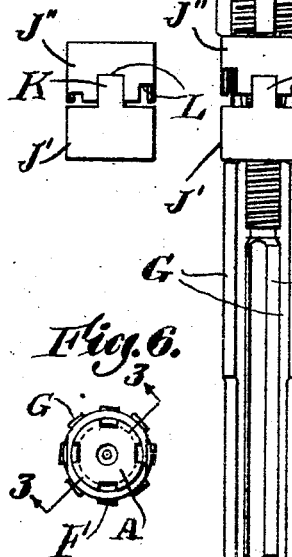
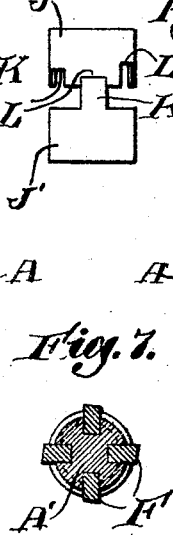
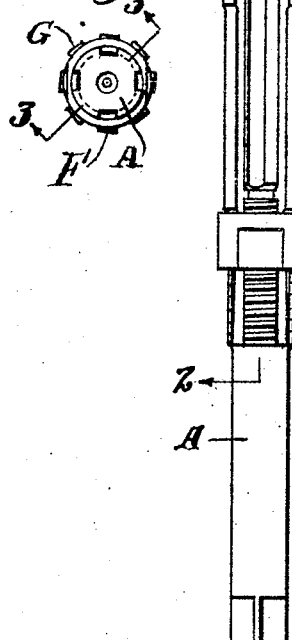
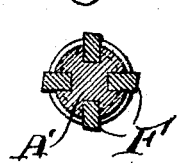
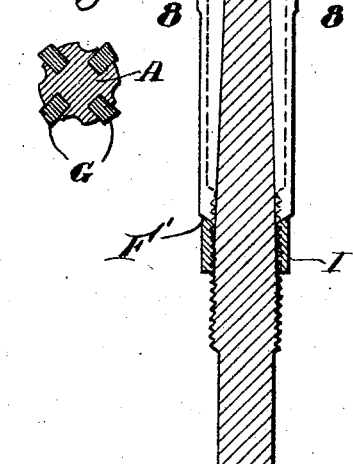
Inventor
Charles E. Gale
by Mitchell, Chadwick & Kent
Attorneys Patented Mar. 30, 1926.

1,579,102

UNITED STATES PATENT OFFICE.

CHARLES E. GALE, OF WEYMOUTH, MASSACHUSETTS, ASSIGNOR, BY MESNE ASSIGNMENTS, TO GREENFIELD TAP AND DIE CORPORATION, OF GREENFIELD, MASSACHUSETTS, A CORPORATION OF MASSACHUSETTS.

ROTARY CUTTING TOOL.

Application filed December 4, 1923. Serial No. 678,477.

*To all whom it may concern:*

Be it known that I, CHARLES E. GALE, a citizen of the United States, residing at Weymouth, in the county of Norfolk and State of Massachusetts, have invented certain new and useful Improvements in Rotary Cutting Tools, of which the following is a specification.

This invention relates to improvements in rotary cutting tools and the like. More especially it pertains to a reamer of the self-guided type in which a succession of blade-sets distributed along the axis of the reamer enable two or more aligned holes to be reamed simultaneously, or, if a non-cutting blade-set be used, this set may be rotated within one hole and serve to guide the progress of cutting blades through another hole. In the first instance, when all the blades are cutting blades, it is preferable that the effective cutting diameter of all the sets be the same. In the second instance, when guide blades are used, it may be desirable to have their peripheral faces travel in a surface of revolution of less or greater diameter than the effective diameter of the cutting blades. In either case, once the diametrical relation of the several sets is determined, be they the same or different, it is desirable to have this relation between them continue constant, while permitting their effective diameters to be enlarged or decreased to accommodate the cutting of different size holes.

It is among the objects of the present invention to make possible the accomplishment of these desired results by making all of the blade-sets adjustable simultaneously along the axis of the tool, and thereby radially thereof, to change their effective diameters by the same amount; and by making any of the blade-sets separately adjustable along the tool to vary its effective diameter without altering that of another set.

These objects are accomplished by providing a reamer body with successive sets of grooves spaced longitudinally along the axis of the tool, whose bottoms diverge equally from the tool axis. A blade set is arranged in each set of grooves and is held there by clamping members engaging the ends of its blades, there being a clamping member intermediate each two successive sets of blades and acting on both of them; and the several sets of blades being movable together longitudinally of the tool to adjust all of the blades simultaneously and similarly, outward or inward depending upon whether the longitudinal movement is upward or downward along the groove bottoms. The intermediate clamping member serves not only as a clamp but also as a spacer, and as a means whereby the two sets of blades which engage it may be separately adjusted along the tool with respect to each other, thus enabling their respective effective diameters to be varied. When thus adjusted with respect to each other they may thereafter be moved together along the grooves to increase or decrease their effective diameters, but during such movement the actual difference between their effective diameters, as determined by the setting of the intermediate member, will remain unchanged.

The invention is illustrated and described specifically in its application to a line reamer, but other adaptations of the principles can be made. It is intended that the patent shall cover, by suitable expression in the appended claims, whatever features of patentable novelty exist in the invention disclosed.

In the accompanying drawings:—

Figure 1 is a side view of a reamer embodying the invention;

Figure 2 is a medial section, on line 2—2 of Figure 1;

Figure 3 is another medial section taken at a 45° angle to the section of Figure 2, as on line 3—3 of Figure 6;

Figures 4 and 5 are similar views of the intermediate member showing it in different adjusted positions;

Figure 6 is an end view; and

Figures 7 and 8 are sections on lines 7—7 and 8—8 of Figures 2 and 3 respectively.

Referring to the drawings, which show a reamer having only two sets of blades, the shaft or body A of the reamer is provided with tapered longitudinal grooves B and C arranged in two separate sets wherein the blades are spaced apart in the longitudinal direction of the reamer. In the particular embodiment shown, in which there are two sets of four grooves each, those of one set are displaced angularly 45° from those of the other, being cut in the midst of the extensions of the portions of the body that lie between the grooves of the other set, with the adjacent end portions of the grooves side by side. The bottoms E of all the grooves are inclined alike so that as a whole they form a blade support tapered toward one end of the reamer, both sets being tapered toward the same end. The blades F and G are made with correspondingly inclined under or inner surfaces H so that when bottomed in a groove each operating edge H' will be parallel to the axis of the tool. The ends F' of the blades are beveled, so that when engaged by the undercut ends of the clamping members I and J, they will be both clamped endwise and pressed firmly against the groove bottom.

The remote end-clamping members I are shown in the form of nuts having threaded engagement with the reamer body. The intermediate member or sleeve J has a smooth interior surface and is slidable along and around the slightly reduced portion A' of the reamer body. This member J is made in two parts J' and J", on one of which are extending tongues or struts K adapted to fit within recesses or notches L in the opposing edge of the other part. These notches are of different depths, except that those forming each diametrically opposite pair are equal, so that the member J may in effect be made longer or shorter according to the particular notches chosen to receive the tongues. By thus altering the length of the intermediate member the blades of one set may be shifted along their grooves to a different position therein, either nearer to or farther away from the blades of the other set, without altering the positions of the latter in their respective grooves. This enables the radial projection of the blades of one set to be adjusted to correspond with or differ from the radial projections of the blades in the next adjacent set. But when once so set all the blades and the intermediate member may be shifted together as a unit along the tool by merely backing off one end clamp nut I and setting up the other. In this manner the blades in all of the sets are simultaneously adjustable, and whatever may be the relation of the blades in one set to the blades in another set, this relation will be maintained regardless of the simultaneous longitudinal shifting. Both sets of blades may be cutters or one set may be guides and the other set cutter, or the one set may be a combined cutting and guiding blade as are blades G shown.

The advantage of having the different sets of blades separately adjustable enables one set of blades to take a sort of roughing cut while the following set, being of slightly larger diameter can finish the hole with a high degree of smoothness. Or if two aligned holes are to be made larger, the leading blades can be set as of the diameter of the holes that are to be cut, and serve as guides for the cutting blades of greater effective diameter. Although usually, and especially for a reamer, the blades in a set will be plural, and all blades of a set will be alike, this is not necessarily so.

By arranging the grooves of successive sets in staggered relation about the tool, that is with the grooves of one set alternating with those of the next around the cylinder, their adjacent ends may extend past each other thereby permitting the blades to be set nearer together along the axis than would be possible if the grooves were in alignment. This allows a short intermediate member to be employed, and makes longitudinal compactness possible.

I claim as my invention:

1. A reamer comprising a body, blades carried by the body and arranged in sets spaced longitudinally of the body, and means for simultaneously adjusting the blades in all of said sets.

2. A reamer comprising a body, blades carried by the body and arranged in sets spaced longitudinally of the body, and means for simultaneously moving said sets longitudinally and thereby radially of the body.

3. A cutting tool comprising a body having inclined grooves; longitudinally spaced blades slidably mounted in said grooves and provided with beveled ends; an intermediate member arranged between the adjacent ends of said blades and provided with beveled ends adapted to engage and hold the blade ends; and holding means engaging the remote ends of the blades, all of the blades and said member being movable simultaneously along the tool.

4. A reamer comprising a body provided with grooves arranged in sets spaced longitudinally of the body and having their bottoms inclined; blades having beveled ends and slidably engaging in said grooves, whereby, on sliding, their cutting edges progress longitudinally and radially of said body; a sleeve interposed between the inner ends of said blades and having beveled ends adapted to engage said inner ends of the blades; and nuts having threaded engagement with the end portions of said body, arranged to retain said sleeve and blades in tight engagement.

5. A self guided cutting tool having a succession of blades along its axis, comprising the combination, with the body and said blades mounted thereon, of means adapted to clamp all of the blades endwise, and a medial member, loose on the body and adapted to clamp adjacent ends of endwise adjacent blades, as the said endwise clamping means move toward each other.

6. A self guided cutting tool having a succession of blades along its axis, comprising the combination, with the body and said blades mounted thereon, of means adapted to clamp all of the blades endwise, and a medial member, loose on the body and adapted to clamp adjacent ends of endwise adjacent blades; both members of the endwise clamp being movable along the body while engaging it for clamping, and the medial clamp being free to slide endwise therewith.

7. A rotary cutting tool comprising a body; blades carried by the body and arranged in sets spaced longitudinally thereof; and means holding said blades on the body, comprising a spacer of variable length arranged between successive sets.

8. A rotary cutting tool comprising a body provided with grooves having their bottoms inclined with respect to the axis; blades arranged in sets, spaced longitudinally, slidably engaging in said grooves, whereby, on sliding longitudinally their cutting edges progress also radially of said body; and an intermediate spacing member whose length is variable, between the successive sets, thereby to vary the relative radial settings of the said sets.

9. A rotary cutting tool comprising a body, blades carried by the body and arranged in sets spaced longitudinally thereof; and an intermediate two-part member, arranged between successive blade sets, engaging their adjacent ends; there being a tongue on one part of said member, and notches of varying depths in the other part adapted to receive the tongue, thereby to permit the said member to be adjusted to various lengths, and so to vary the longitudinal relation of the blade sets with respect to each other.

10. A rotary cutting tool comprising a body; blades carried by the body and arranged in sets spaced longitudinally thereof; and means for simultaneously adjusting the blades in all of said sets; said means comprising a device adapted to permit varied settings of the blade sets longitudinally with respect to each other.

11. A rotary cutting tool comprising a body having inclined grooves, longitudinally spaced sets of blades slidably mounted in said grooves, and means for simultaneously adjusting the blade sets along said grooves to vary their radial projection; said means comprising a device adapted to permit varied settings of one blade set longitudinally with respect to another blade set thereby to vary their respective radial projections.

12. A rotary cutting tool having grooves arranged in sets spaced longitudinally of the body, with the grooves of one set displaced angularly about the body with respect to those of the next adjacent set, blades carried by the body and arranged in said groove, and means for holding the blades in the grooves comprising an intermediate member encircling the said body and adapted to hold the adjacent ends of successive blade sets.

13. A rotary cutting tool having grooves arranged in successive sets spaced longitudinally and angularly about the body, the grooves of each set being cut in the midst of the extensions of the portions of the body that lie between the grooves of the next with adjacent end portions side by side; blades carried by the body and arranged in said grooves; and means for holding the blades in the grooves comprising an intermediate member adapted to encircle the body around the side by side groove ends and engage the adjacent ends of the blades in successive sets.

Signed at Boston, Massachusetts, this thirtieth day of November, 1923.

CHARLES E. GALE.